June 24, 1930.   M. FAHRNKOPF   1,768,311
PAN LIFTER
Filed Dec. 18, 1928
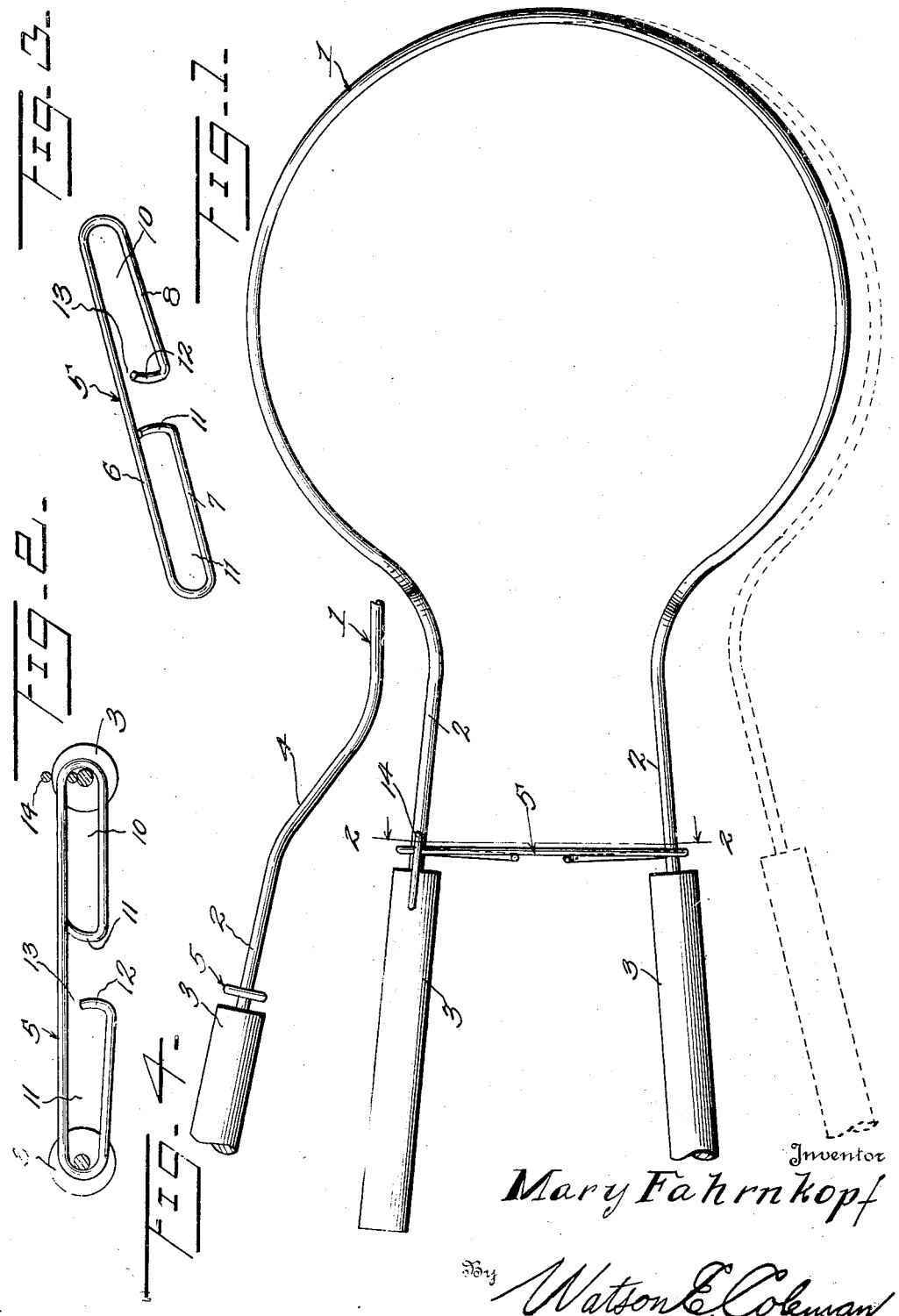

Patented June 24, 1930

1,768,311

UNITED STATES PATENT OFFICE

MARY FAHRNKOPF, OF BEMENT, ILLINOIS

PAN LIFTER

Application filed December 18, 1928. Serial No. 326,727.

This invention relates to a handling implement for hot pans, more especially pie plates or pans and the like.

The primary object of this invention is to provide a pan handling or lifting implement which may be readily adjusted to suit the particular pan to be handled and which may be easily manipulated with one hand leaving the other hand of the user free for the performance of other duties.

Another object of the invention is to provide a pan lifter adjustable for various sizes of pans, having an improved type of clip device associated with handle members thereof which controls to a certain extent the regulation of the size of the pan carrier.

A further object of the invention is to provide a pan lifter of simple construction, easy to manipulate and of strong and durable design.

The invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in plan of the plate lifter embodying the present invention;

Figure 2 is a sectional view taken transversely of the handles substantially upon the line 2—2 of Figure 1;

Figure 3 is a detailed perspective view of the arm holding clip, per se;

Figure 4 is a detailed side elevational view of the central portion of the lifter.

Referring to the drawing in detail wherein like numerals of reference indicate corresponding parts throughout the several views the numeral 1 indicates generally the body portion of the pan lifter embodying this invention, the same being preferably constructed of a heavy gauge resilient wire, formed into a loop as shown and having the ends brought together in spaced normally substantially parallel relation forming the arms 2 upon the terminals of which the handle bodies 3, preferably formed of wood, are secured.

As shown, the arms 2 adjacent the point where they merge with the body of the loop 1 are bent, as indicated at 4 so that the handles 3 will be arranged in a plane above the loop when the same is placed upon a table surface or the like and will extend at an inclination upwardly therefrom in the manner shown. With this construction it will be readily seen that the loop can be placed flat upon a surface supporting a pan to be lifted, without danger of the hand of the operator, when engaged over the handles, coming into contact with the pan supporting surface.

In order to normally prevent undue spreading of the handles 3 by reason of the natural tendency of the resilient loop to open, a restraining link 5 is provided which connects between the portions 2 of the lifter in the manner shown. This link 5 consists of a straight bar portion 6 having a portion of each end turned back upon itself as indicated at 7 and 8 to form the elongated loops 9 and 10. The terminal of the portion 7 is bent inwardly to contact with the body of the bar portion 6 as indicated at 11 so that when one of the arms 2 is passed through the loop 9 the link cannot become disconnected therefrom.

The terminal of the portion 8 is also turned inwardly toward the bar 6 as indicated at 12 but is slightly spaced therefrom leaving the passage 13 to permit the other arm 2 of the loop to be slipped into or out of the loop 10 so that the link 5 may be completely disengaged from one arm of the loop 1 to permit the arms and handles to be spread further apart than would ordinarily be permitted by the link.

In order to prevent the link 5 from sliding toward the loop 1 upon the supporting arms 2, a staple 14 is driven into one of the handles to receive one side of the loop 9 so that, while the loop 10 may be freely disengaged from its arm of the lifting loop 1 the other end of the link will be secured and always at hand when wanted.

From the foregoing description it will be readily seen that with the pan lifter embodying this invention pans of various sizes may be readily lifted and carried about without danger of the user of the lifter being burned or dropping the pan. The link serves to maintain the handles sufficiently close under normal conditions to permit the user's hand to readily grasp the two handles together so that one hand only is needed for the use of the lifter. As previously explained when pans of greater sizes than usual are to be lifted the link 5 may be shifted to free the arms 2 so that the loop 1 may be spread to the desired size to take the larger pan.

Having thus described my invention what I claim is:—

1. A pan lifter comprising a resilient loop member having outwardly extending arms, a pair of handles mounted on said arms, and a locking member loosely engaging one of said arms, said locking member being adapted to removably engage the other of said arms, said locking member comprising a closed loop and an open loop, said closed loop being mounted about one of said arms, and said open loop being adapted to removably engage the other of said arms and means carried by one of the handles whereby to prevent longitudinal movement of said locking member.

2. A pan lifter comprising a resilient loop member having outwardly extending arms, a pair of handles on said arms, a locking member for said arms, said locking member comprising a pair of loop members, one of said loops being open for removable engagement with one of the arms, and the other loop loosely engaging the other arm, and a staple secured to one of said handles and engaging said locking member whereby to hold said locking member against longitudinal movement on said arms.

In testimony whereof, I hereunto affix my signature.

MARY FAHRNKOPF.